United States Patent
Haggerty et al.

(10) Patent No.: US 10,106,106 B2
(45) Date of Patent: Oct. 23, 2018

(54) AUTOMATED DRIVING SOLUTION GATEWAY

(71) Applicant: FORD GLOBAL TECHNOLOGIES, LLC, Dearborn, MI (US)

(72) Inventors: Terry Haggerty, Plymouth, MI (US); Randal Henry Visintainer, Ann Arbor, MI (US); Paul Mascarenas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 410 days.

(21) Appl. No.: 14/491,570

(22) Filed: Sep. 19, 2014

(65) Prior Publication Data

US 2016/0082903 A1 Mar. 24, 2016

(51) Int. Cl.
*B60R 16/023* (2006.01)
*B60W 30/00* (2006.01)
*G05D 1/00* (2006.01)

(52) U.S. Cl.
CPC .......... *B60R 16/023* (2013.01); *B60W 30/00* (2013.01); *G05D 1/0088* (2013.01); *G05D 2201/0213* (2013.01)

(58) Field of Classification Search
CPC .............. G07C 5/008; G07C 9/00309; G07C 2009/00793; B60R 25/24; F02N 11/0807
USPC ............ 701/2, 36, 31.4, 22–25, 3; 180/204; 705/44; 709/28; 726/3–5, 7
See application file for complete search history.

(56) References Cited

U.S. PATENT DOCUMENTS 6,141,710 A 10/2000 Miesterfeld
8,260,498 B2 9/2012 Deng
(Continued)

FOREIGN PATENT DOCUMENTS

CN 101030309 A * 9/2007
JP 2004338640 A 12/2004
(Continued)

OTHER PUBLICATIONS

Implementation of CAN bus in an autonomous all-terrain vehicle; Gurram, S.K. ; Conrad, J.M.; Southeastcon, 2011 Proceedings of IEEE; DOI: 10.1109/SECON.2011.5752943; Publication Year: 2011 , pp. 250-254.*

(Continued)

*Primary Examiner* — Cuong H Nguyen
(74) *Attorney, Agent, or Firm* — Franklin A. MacKenzie; Brooks Kushman P.C.

(57) ABSTRACT

A gateway module of a vehicle may be in communication with vehicle components over a vehicle bus and with an autonomous driving system over a non-vehicle bus connection. The gateway module may be configured to send data from the vehicle bus over the connection to the autonomous driving system, receive a vehicle action request over the connection from the autonomous driving system, and provide the vehicle action request to the vehicle bus for processing by the vehicle components to autonomously drive the vehicle. The autonomous driving computing device may be configured to authenticate with the gateway module of a vehicle over the non-vehicle bus connection, receive data from the vehicle bus over the connection to the gateway module, and send the vehicle action request over the connection to the gateway module for providing to the vehicle components over the vehicle bus.

17 Claims, 4 Drawing Sheets

(56) References Cited

U.S. PATENT DOCUMENTS

| | | | | |
|---|---|---|---|---|
| 8,649,940 | B2* | 2/2014 | Bonefas | B62D 12/02 |
| | | | | 348/143 |
| 8,675,475 | B2* | 3/2014 | Bisdikian | H04W 24/04 |
| | | | | 370/218 |
| 8,831,568 | B2* | 9/2014 | Cherian | H04W 4/70 |
| | | | | 455/411 |
| 9,119,342 | B2* | 9/2015 | Bonefas | A01D 34/001 |
| 9,253,712 | B2* | 2/2016 | Cherian | H04W 4/70 |
| 9,479,477 | B2* | 10/2016 | Wu | H04W 12/06 |
| 9,642,305 | B2* | 5/2017 | Nykamp | A01D 43/087 |
| 9,794,327 | B2* | 10/2017 | Pareglio | H04L 61/1511 |
| 9,800,999 | B2* | 10/2017 | Ahn | H04W 4/70 |
| 9,854,466 | B2* | 12/2017 | Wu | H04W 4/70 |
| 2007/0156313 | A1* | 7/2007 | Fudali | G07C 5/008 |
| | | | | 701/31.4 |
| 2011/0098886 | A1* | 4/2011 | Deng | 701/41 |
| 2011/0153207 | A1 | 6/2011 | Suzaki et al. | |
| 2011/0288695 | A1 | 11/2011 | Gariepy et al. | |
| 2012/0047551 | A1* | 2/2012 | Pattar | H04W 4/00 |
| | | | | 726/1 |
| 2012/0239224 | A1* | 9/2012 | McCabe | B66F 9/063 |
| | | | | 701/2 |
| 2013/0201316 | A1* | 8/2013 | Binder | H04L 67/12 |
| | | | | 348/77 |
| 2013/0211623 | A1* | 8/2013 | Thompson | G07C 5/008 |
| | | | | 701/2 |
| 2014/0136414 | A1* | 5/2014 | Abhyanker | G06Q 50/28 |
| | | | | 705/44 |
| 2014/0164579 | A1* | 6/2014 | Douthitt | G07C 5/008 |
| | | | | 709/219 |
| 2014/0309813 | A1* | 10/2014 | Ricci | B60Q 1/00 |
| | | | | 701/2 |
| 2015/0191135 | A1* | 7/2015 | Ben Noon | B60R 16/023 |
| | | | | 726/22 |
| 2015/0191136 | A1* | 7/2015 | Ben Noon | B60R 16/023 |
| | | | | 726/23 |
| 2015/0191151 | A1* | 7/2015 | Ben Noon | B60R 16/023 |
| | | | | 340/426.1 |
| 2015/0195297 | A1* | 7/2015 | Ben Noon | B60R 16/023 |
| | | | | 726/22 |
| 2015/0350176 | A1 | 12/2015 | Mabuchi | |
| 2016/0098577 | A1* | 4/2016 | Lacey | G06F 21/6263 |
| | | | | 726/28 |
| 2016/0104008 | A1* | 4/2016 | Lacey | G06F 21/6263 |
| | | | | 726/28 |

FOREIGN PATENT DOCUMENTS

| | | |
|---|---|---|
| WO | 2007145998 A2 | 12/2007 |
| WO | 2014087503 A1 | 12/2014 |
| WO | 2015076734 A1 | 5/2015 |
| WO | 2015076736 A1 | 5/2015 |

OTHER PUBLICATIONS

Modularity, adaptability and evolution in the AUTOPIA architecture for control of autonomous vehicles; Perez, J.; Gonzalez, C.; Milanes, V.; Onieva, E.; Godoy, J.; de Pedro, T.; Mechatronics, 2009. ICM 2009. IEEE International Conference on DOI: 10.1109/ICMECH.2009.4957197; Publication Year: 2009, pp. 1-5.*

Modeling and control of a platoon of autonomous buses; Lam, S.; Katupitiya, J.; Intelligent Vehicles Symposium (IV), 2013 IEEE DOI: 10.1109/IVS.2013.6629590; Publication Year: 2013, pp. 958-963.*

Time critical wireless data transmission in autonomous control applications; Bliznuks, D.; Zagurskis, V.; Fantuzzi, C.; Telecommunications Forum (TELFOR), 2013 21$^{st}$; DOI: 10.1109/TELFOR.2013.6716206; Publication Year: 2013, pp. 196-199.*

Mulit-level system integration based on AUTOSAR; Ulrich Freund; 2008 ACM/IEEE 30th International Conference on Software Engineering; Year: 2008; pp. 581-582, DOI: 10.1145/1368088.1368168.*

A key agreement scheme for avionics communications security; Dahai Du; Qiao Li; Zheng Li; Hong Fan; Chengyuan Li; Hua Shao 2012 IEEE/AIAA 31st Digital Avionics Systems Conference (DASC); Year: 2012; pp. 7B6-1-7B6-8, DOI: 10.1109/DASC.2012.6382414.*

Design of automotive gateway based on FlexRay; Xin Chen; Guixiang Zhang; Electric Information and Control Engineering (ICEICE), 2011 International Conference on; Year: 2011; pp. 4897-4900, DOI: 10.1109/ICEICE.2011.5776863.*

Design of CAN/GPRS Gateway for Vehicle Remote Communications; Yong Xu; Qun-li Yang; Zhang-hua You; 2009 International Conference on Measuring Technology and Mechatronics Automation; Year: 2009, vol. 1; pp. 131-133, DOI: 10.1109/ICMTMA.2009.650.*

Vehicle speed control and safety prototype using controller area network; Priyanka A. Wagh et al.; 2017 Inter Conf on Computational Intelligence in Data Science(ICCIDS); Year: 2017; pp. 1-5, IEEE Conf.*

Analysis of UGP to achieve compatibility with Cooperative ITS station; Hyun Jeong Yun et al.; 2015 Inter. Conf. on Information and Comm Technology Convergence (ICTC); Year: 2015; pp. 888-890; IEEE Conferences.*

A review: Control area network (CAN) based Intelligent vehicle system for driver assistance using advanced RISC machines (ARM) Ashutosh U. Jadhav et al.; 2015 Inter Conf on Pervasive Computing (ICPC); year: 2015; pp. 1-3.*

Delay tolerant network for autonomous robotic vehicle charging and hazard detection; Tolga Zeybek et al.; 2014 IEEE/ACIS 13th International Conference on Computer and Information Science (ICIS); Year: 2014; pp. 79-85.*

G. Chen et al., An Architecture for Automated Driving in Urban Environments, 2008, 10 pages, Inria Rhône-Alpes & LIG-CNRS Lab., Grenoble, France.

S. Kumar et al., A Cloud-Assisted Design for Autonomous Driving, 2012, 6 pages, Massachusetts Institute of Technology, Helsinki, Finland.

J. Dias et al., Software Architecture for Autonomous Vehicles, 2009, 83 pages, University of Lisbon, Portugal.

T. Gaska, Exploring Security Synergies in Driverless Car and UAS Integrated Modular Architectures (IMAs), Technical Presentation, 2014, 22 pages, Orlando, Florida.

Daniel Göhring, Controller Architecture for the Autonomous Cars: MadeInGermany and e-Instein, 2012, 23 pages, University of Berlin, Germany.

J. Naranjo et al., Autopia Architecture for Automatic Driving and Maneuvering, 2006, 6 pages, IEEE Intelligent Transportation Systems Conference, Toronto, Canada.

* cited by examiner

AUTOMATED DRIVING SOLUTION GATEWAY

TECHNICAL FIELD

Aspects of the disclosure relate to a gateway module for providing an interface between in-vehicle systems and autonomous driving systems.

BACKGROUND

Modern vehicles include systems and subsystems that communicate with one another over controller-area-network (CAN), Ethernet or other in-vehicle networks. Many modern vehicles also include an on-board diagnostics II (OBD-II) port, which provides access to the in-vehicle network for diagnostic or data visualization purposes.

SUMMARY

In a first illustrative embodiment, a system includes a gateway module of a vehicle, in communication with vehicle components over a vehicle bus and with an autonomous driving system over a non-vehicle bus connection, configured to send data from the vehicle bus over the connection to the autonomous driving system, receive a vehicle action request over the connection from the autonomous driving system, and provide the vehicle action request to the vehicle bus for processing by the vehicle components to autonomously drive the vehicle.

In a second illustrative embodiment, a system includes an autonomous driving computing device configured to authenticate with a gateway module of a vehicle over a non-vehicle bus connection, the vehicle including vehicle components connected to the gateway module over a vehicle bus, receive data from the vehicle bus via the connection, and send, over the connection, a vehicle action request including an instruction to be provided over the vehicle bus to command the vehicle components to autonomously drive the vehicle.

In a third illustrative embodiment, a computer-implemented method includes sending, by a gateway module of a vehicle in communication with vehicle components over a vehicle bus and with an autonomous driving system over a non-vehicle bus connection, data from the vehicle bus over the connection to the autonomous driving system, receiving a vehicle action request over the connection from the autonomous driving system, and providing the vehicle action request to the vehicle bus for processing by the vehicle components to autonomously drive the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may integrate with autonomous-driving components in order to add semi-autonomous or autonomous driving feature to the vehicle. These autonomous-driving components may connect to the vehicle network, and may send and receive information with the existing features of the vehicle. In an example, the vehicle may include base vehicle systems, an autonomous-driving vehicle system, and a gateway configured to provide access between the base vehicle systems and autonomous-driving systems.

The autonomous-driving system may include an electrical architecture and control system for automated driving functions. The autonomous-driving system may receive input from various sensors, and may utilize driving algorithms to command braking, steering, acceleration, and other functions of the vehicle. The base vehicle system may include the electrical architecture and control system for the base vehicle. The base vehicle systems may include various sensors and actuators configured to control the systems of the vehicle based on input received from the driver or from the automated driving systems.

The system may further include a gateway module between the autonomous-driving components and the base vehicle components. The gateway module may be configured to provide an electrical interface between the architectures of the autonomous-driving components and the base vehicle components. In an example, the gateway module may be configured to translate signals and commands from the autonomous-driving system into signals and commands that can be understood by the base vehicle electrical system. Conversely, the gateway module may be configured to translate signals and commands from the base vehicle electrical system into signals and commands that can be understood by automated driving system.

By using the gateway module, the automation system may be able to associate and authenticate with the vehicle, receive data from the base vehicle systems, and provide automation commands to the base vehicle systems. Moreover, using the gateway module, the automation system may receive acknowledgements of commands provided to the base vehicle systems, as well as indications of other vehicle status information.

Figure 1:
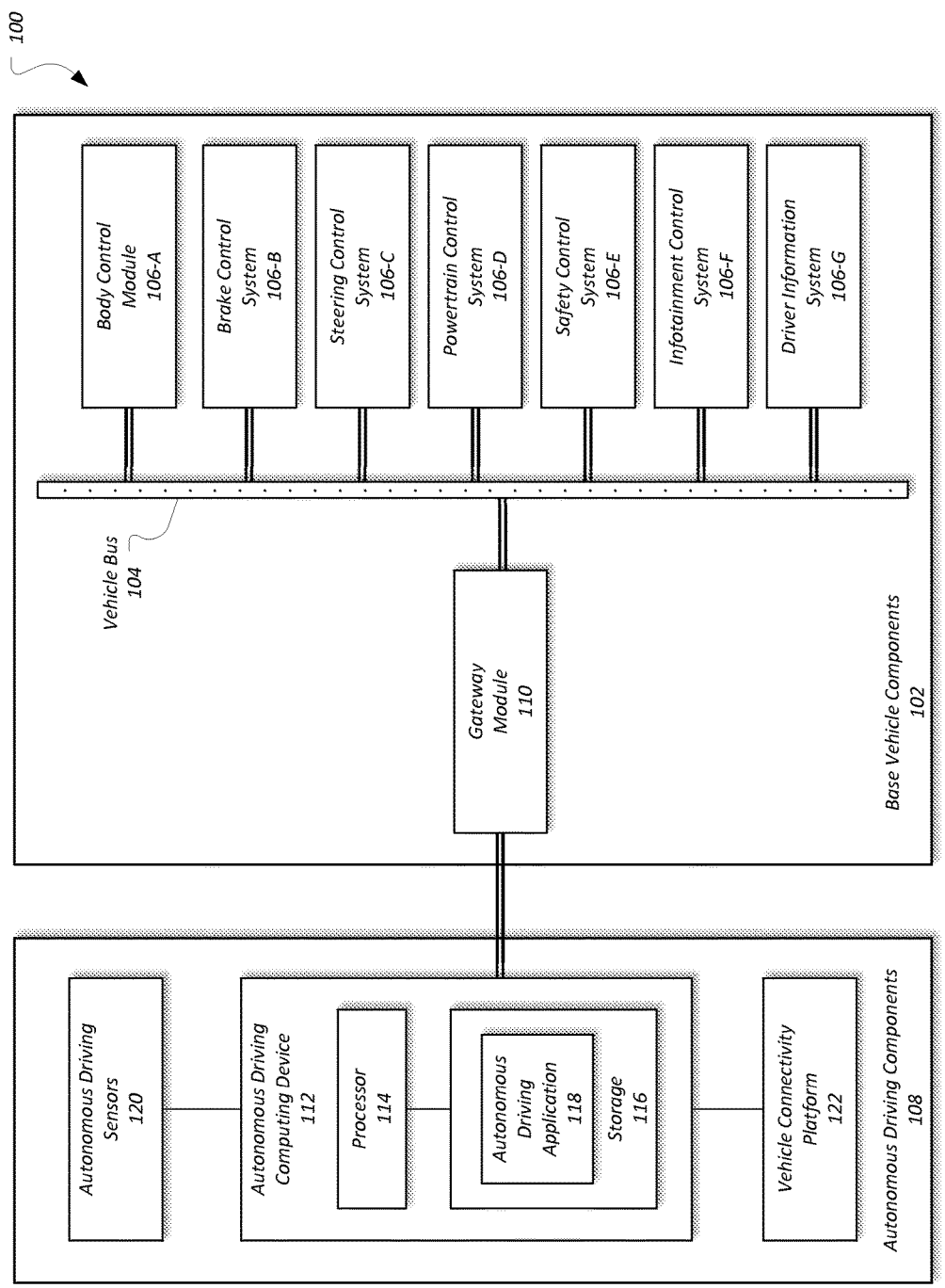
FIG. 1 illustrates a block diagram of an example vehicle including a gateway module for handling messaging between autonomous driving components and base vehicle components.

FIG. 1 illustrates a block diagram of an example vehicle 100 including a gateway module 110 for handling messaging between autonomous driving components 108 and base vehicle components 102. The base vehicle components 102 include a plurality of system components 106 in communication over one or more vehicle buses 104 and configured to perform various vehicle 100 functions. The autonomous driving components 108 include various types of computing apparatus to facilitate commanding of the base vehicle components 102 in an automated manner.

The vehicle bus 104 may include various method of communication available between the system components 106, as well as between the system components 106 and the gateway module 110. As some non-limiting examples, the vehicle bus 104 may include a controller area network (CAN) bus and/or an Ethernet network.

The base vehicle components 102 include various modules and systems of the vehicle 100 a body control module 106-A, a brake control system 106-B, a steering control system 106-C, a powertrain control system 106-D, a safety control system 106-E, an infotainment control system 106-F, and a driver information system 106-G. As depicted, the modules and systems 106 are represented as discrete modules and systems 106. However, the modules 106 may share physical hardware, firmware, and/or software, such that the functionality from multiple modules 106 may be integrated into a single module 106, and that the functionality of various such modules 106 may be distributed across a plurality of modules 106.

The body control module 106-A may be configured to support various functions of the vehicle 100 related to control of current loads feeding off the vehicle 100 battery. Examples of such current loads include, but are not limited to, exterior lighting, interior lighting, heated seats, heated windshield, heated backlight, and heated mirrors. Additionally, the body control module 106-A may be configured to manage vehicle 100 access functions, such as keyless entry, remote start, and point of access status verification (e.g., closure status of the hood, doors and/or trunk of the vehicle 100).

The brake control system 106-B may be configured to control braking functions of the vehicle 100. In some examples, the brake control system 106-B may be configured to receive signal information from vehicle wheel sensors and/or drivetrain differentials, and manage anti-lock and anti-skid brake functions through control of brake line valves that adjust brake pressure from the master cylinder.

The steering control system 106-C may be configured to aid in vehicle steering by augmenting or counter-acting steering effort provided to the vehicle 100 wheels. In some cases, the augmented steering effort may be provided by a hydraulic steering assist configured to provide controlled energy to the steering mechanism, while in other cases the augmented steering effort may be provided by an electric actuator system.

The powertrain control system 106-D, sometimes referred to as a powertrain control module (PCM), may be configured to perform engine control and transmission control functions for the vehicle 100. With respect to engine control, the powertrain control system 106-D may be configured to receive throttle input and control actuators of the vehicle engine to set air/fuel mixture, ignition timing, idle speed, valve timing, and other engine parameters to ensure optimal engine performance and power generation. With respect to transmission control, the powertrain control system 106-D may be configured to receive inputs from vehicle sensors such as wheel speed sensors, vehicle speed sensors, throttle position, transmission fluid temperature, and determine how and when to change gears in the vehicle 100 to ensure adequate performance, fuel economy and shift quality.

The stability control system 106-E may be configured to provide various functions to improve the stability and control of the vehicle 100. As some examples, the stability control system 106-E may be configured to monitor vehicle sensors (e.g., steering wheel angle sensors, yaw rate sensors, lateral acceleration sensors, wheel speed sensors, etc.), and control the brake control system 106-B, steering control system 106-C, and/or powertrain control system 106-D. As some possibilities, the stability control system 106-E may be configured to provide throttle input adjustments, steering angle adjustments, brake modulation, and all-wheel-drive power split decision-making over the vehicle bus 104 to improve vehicle stability and controllability. It should be noted that in some cases, the commands provided by the stability control system 106-E may override other command input provided by the driver or by the autonomous driving components 108.

The infotainment control system 106-F may be configured to support various features, such as voice command recognition, navigation, and music playback. In some cases, the infotainment control system 106-F may utilize Bluetooth technology and/or smartphone integration to provide vehicle connectivity features such as turn-by-turn directions and music streaming.

The driver information system 106-G may be configured to present vehicle 100 information to the vehicle driver and/or other occupants. For example, the driver information system 106-G may include various gauges and displays included in the instrument cluster or center stack of the vehicle. As some possibilities, the driver information system 106-G may present information such as current vehicle 100 speed and heading, as well as other information regarding the operation of the vehicle 100 systems, such as oil pressure, transmission fluid temperature, current gear selection, engine RPM, etc.

The autonomous driving components 108 may include various types of computing apparatus to facilitate the performance of the functions of the autonomous driving components 108. In an example, the autonomous driving components 108 may include an autonomous driving computing device 112 having one or more processors 114 configured to execute computer instructions, and a storage medium 116 on which the computer-executable instructions may be maintained. A computer-readable storage medium 116 (also referred to as a processor-readable medium 116 or storage 116) includes any non-transitory (e.g., tangible) medium that participates in providing data (e.g., instructions) that may be read by a computer (e.g., by the processor 114). In general, a processor 114 receives instructions, e.g., from the storage 116, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Java Script, Perl, PL/SQL, etc.

The gateway module 110 may be configured to facilitate communication between the autonomous driving components 108 and the base vehicle components 102. For example, the gateway module 110 may be configured to provide information from the system components 106 as received over the vehicle bus 104 over a wired or wireless connection to the autonomous driving computing device 112, and may forward commands from the autonomous driving computing device 112 over the vehicle bus 104 to the system components 106. Accordingly, the gateway module 110 may many the base vehicle components 102 with the autonomous driving components 108, while providing a clear and unified interface between the automation and in-vehicle components.

The autonomous driving application 118 may be one application included on the storage 116 of the autonomous driving computing device 112. The autonomous driving application 118 may include instructions that, when executed by the autonomous driving computing device 112, cause the autonomous driving computing device 112 to provide autonomous driving commands to the base vehicle components 102 via the gateway module 110. As some possibilities, the autonomous driving application 118 may include steering algorithms, braking algorithms, throttle algorithms, and user experience/human machine interface functionality configured to provide for automatic driving of the vehicle 100 to a specified destination.

The autonomous driving components 108 may further include one or more autonomous driving sensors 120 configured to provide input to the autonomous driving application 118 apart from the information received from the vehicle 100 via the gateway module 110. In an example, the autonomous driving sensors 120 may include one or more video camera devices configured to capture information regarding the surroundings of the vehicle 100. In another example, the autonomous driving sensors 120 may include laser, radar, sonar, or other types of distance and/or obstacle sensors.

The autonomous driving components 108 may also include a vehicle connectivity platform 122 configured to facilitate communication between the autonomous driving components 108 and other sources of information. In an example, the vehicle connectivity platform 122 may facilitate communication of the autonomous driving components 108 with vehicle infrastructure, such as traffic lights or other traffic controls, that may provide information regarding upcoming situations to which the autonomous driving application 118 may wish to respond. In another example, the vehicle connectivity platform 122 may facilitate communication of the autonomous driving components 108 with other vehicles 100, to allow the vehicle 100 to receive information regarding the current status or intended actions of others within the vicinity of the vehicle 100. Further aspects of the operation of the vehicle 100 are discussed in detail with respect to the FIGS. 2-5 below.

Figure 2:
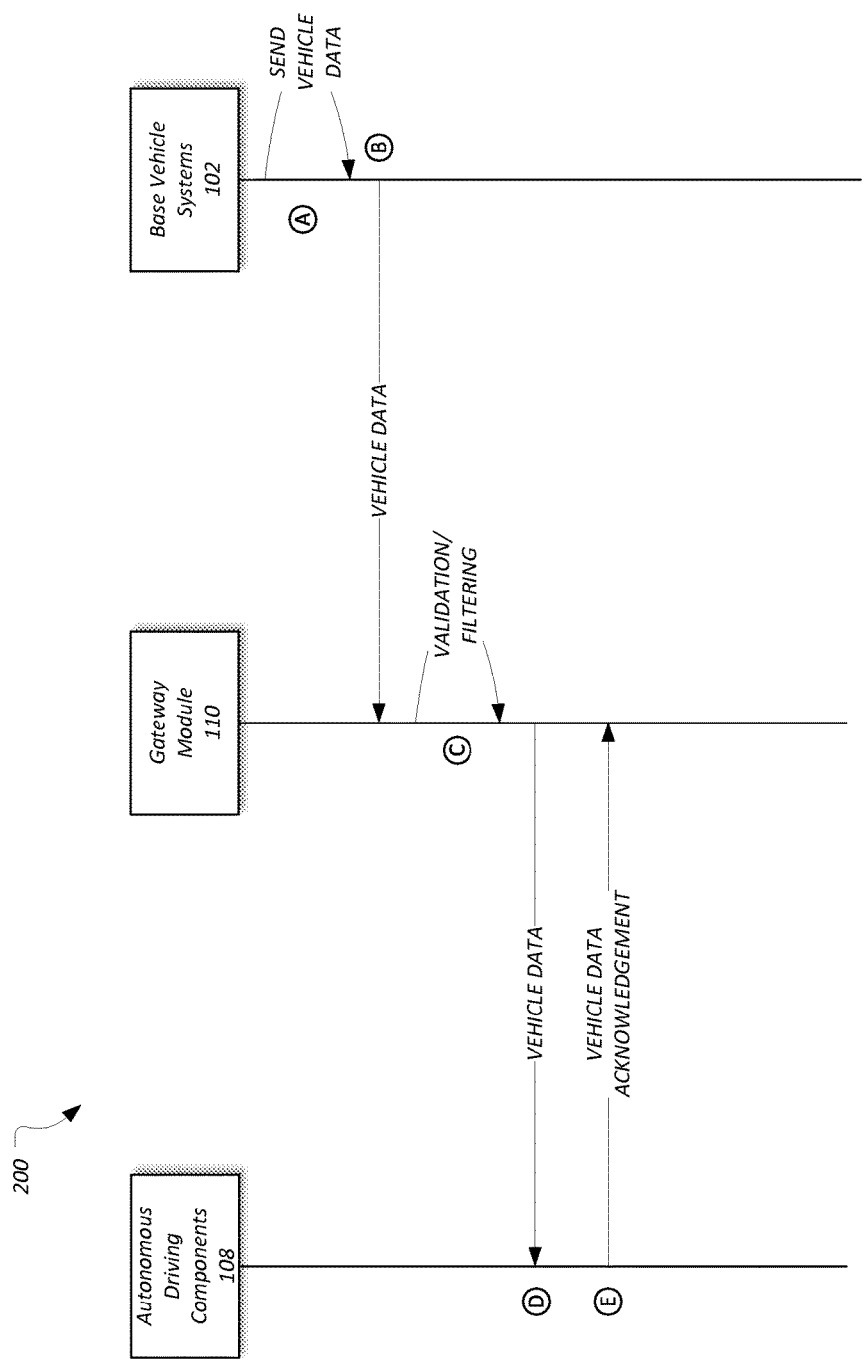
FIG. 2 illustrates an example data flow for providing in-vehicle data from the base vehicle components to the autonomous driving computing device.

FIG. 2 illustrates an example data flow 200 for providing in-vehicle data from the base vehicle components 102 to the autonomous driving computing device 112. The interaction may be managed, for example, by the gateway module 110 of the vehicle 100.

At time index (A), the base vehicle systems 102 send an in-vehicle command. For example, one of the system components 106 may send a message over the vehicle bus 104 intended for another of the system components 106. As one possibility, the powertrain control system 106-D may broadcast a command indicating a change in state of the vehicle powertrain (e.g., the engine being started and reaching a minimum RPM). As another possibility, the stability control system 106-E may send a message intended for the steering control system 106-C to provide for steering angle adjustment apart from other vehicle 100 steering input.

At time index (B), the gateway module 110 monitors the vehicle data traversing the vehicle bus 104. The gateway module 110 may observe data traffic on the vehicle bus 104, regardless of what system components 106 are the intended recipients of the data traffic. In the illustrated example, the gateway module 110 observes the in-vehicle command provided by the one of the system components 106 at time index (A).

At time index (C), the gateway module 110 validates the vehicle data. The validation may include for example, filtering of data messages on the vehicle bus 104 such that only a predefined subset of messages are provided to the autonomous driving components 108. Additionally or alternately, the validation may include adjustments to the form of the messages that may be provided to the autonomous driving components 108, such as adjustments to the data format of the command or to the information included in the command. As another possibility, the autonomous driving components 108 may subscribe to various messages or types of messages with the gateway module 110 that the autonomous driving components 108 requests to receive.

At time index (D), the gateway module 110 forwards the vehicle data to the autonomous driving components 108. For example, the gateway module 110 may provide the data message over the connection to the autonomous driving computing device 112 of the autonomous driving components 108. In some examples, the gateway module 110 may perform encryption on the command using a key negotiated between the gateway module 110 and the autonomous driving components 108 for security purposes. Accordingly, the gateway module 110 may serve as the gateway between in-vehicle data traversing the vehicle bus 104 and the data utilized by the autonomous driving components 108 for autonomous driving decision-making operations.

At time index (E), the gateway module 110 receives acknowledgement from the autonomous driving components 108. For example, the autonomous driving computing device 112 may replay to the gateway module 110 with an acknowledgement of the data received at time index (D). As the system components 106 may not be aware of the gateway module 110 or autonomous driving components 108, in many examples the gateway module 110 does not provide an acknowledgement to the base vehicle systems 102 of the acknowledgement by the autonomous driving components 108.

Figure 3:
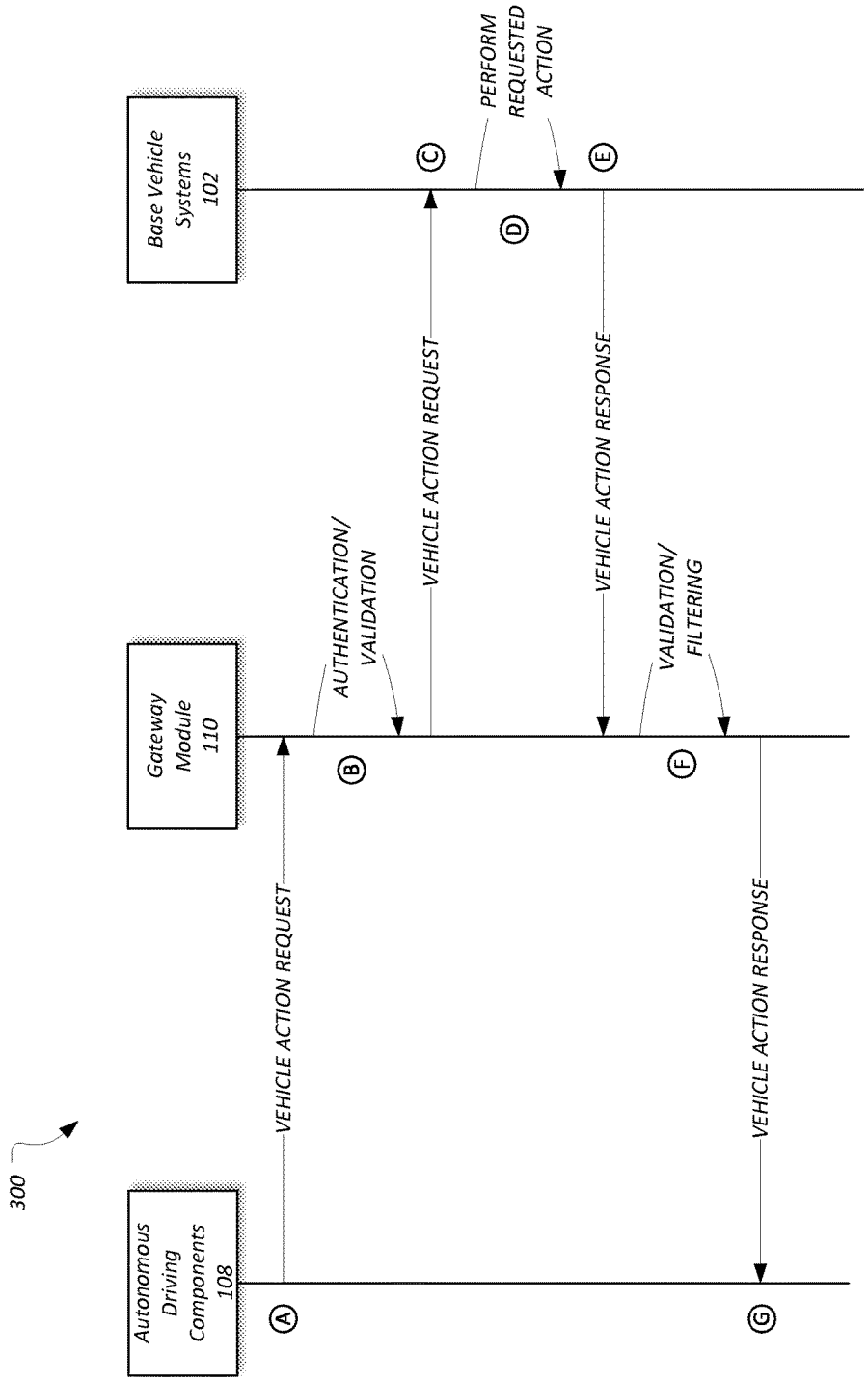
FIG. 3 illustrates an example data flow for sending a request from the autonomous driving computing device to the system components.

FIG. 3 illustrates an example data flow 300 for sending a request from the autonomous driving computing device 112 to the system components 106. The interaction may be managed, for example, by the gateway module 110 of the vehicle 100.

At time index (A), the gateway module 110 receives a vehicle action request from the autonomous driving components 108. For example, the autonomous driving computing device 112 may receive data from the autonomous driving sensors 120, via the vehicle connectivity platform 122, or from the base vehicle system 102 via the gateway module 110 (e.g., as illustrated above with respect to the data flow 200). Based on the received information, the autonomous driving application 118 of the autonomous driving computing device 112 may determine that a throttle adjustment, a steering angle adjustment, or a braking adjustment should be made by the vehicle 100. Accordingly, the autonomous driving application 118 may direct the autonomous driving computing device 112 to send a vehicle request including the adjustment to be implemented by the base vehicle systems 102. The gateway module 110 may accordingly receive the vehicle request via the connection between the autonomous driving components 108 and the gateway module 110.

At time index (B), the gateway module 110 performs validation of the vehicle action request. For example, the gateway module 110 may validate that the autonomous driving components 108 are authorized to send vehicle action requests over the vehicle bus 104 to the system components 106. As one possibility, the validation may include verifying a key or other identifier provided by the autonomous driving components 108 as being authorized to communicate automation messages to the vehicle. As another possibility, the gateway module 110 may perform decryption on the received vehicle request using a key negotiated between the gateway module 110 and the autonomous driving components 108 for security purposes. Additionally or alternatively, the validation may include verifying that the vehicle settings indicate that automation functionality is enabled for the vehicle 100. If validation of the vehicle request fails, the data flow 300 does not continue, or the data flow 300 passes to time index (G) to report a failed action response to the autonomous driving components 108.

At time index (C), the gateway module 110 sends the vehicle action request to the base vehicle systems 102. For example, the gateway module 110 may provide the vehicle request onto the vehicle bus 104 for transport to the intended system component(s) 106. In some cases, the gateway module 110 may perform adjustments to the form of the vehicle request that may be provided to the vehicle bus 104, such as adjustments to the data format of the request or to the information included in the request. In some cases, the gateway module 110 may include a priority or other flag in the request provided to the vehicle bus 104, such that the requested vehicle action may be identifiable by vehicle systems 106 as being an automation command.

At time index (D), the base vehicle systems 102 perform the requested vehicle action. As some possibilities, the powertrain control system 106-D may respond to the vehicle request by performing a throttle adjustment specified by the vehicle message, the steering control system 106-C may respond to the vehicle request by performing a steering angle adjustment specified by the vehicle message, and the brake control system 106-B may respond to the vehicle request by performing a braking adjustment specified by the vehicle message. Accordingly, the actions requested by the autonomous driving components 108 may be performed by the vehicle 100. In some cases, the vehicle systems 106 may respond to the vehicle request according to the priority or other flag in the request indicating the request as being an automation command. As one possibility, manual driver commands or safety system commands may be given priority over automation commands.

At time index (E), the gateway module 110 receives a vehicle action response from the base vehicle systems 102. As some possibilities, the powertrain control system 106-D may provide an action response to the vehicle bus 104 indicative of the result of the requested throttle adjustment, the steering control system 106-C may provide an action response to the vehicle bus 104 indicative of the result of the steering angle adjustment, and the brake control system 106-B may provide an action response to the vehicle bus 104 indicative of the result of the braking adjustment. These results may be indicative of whether the requested action was successfully performed, and may be the same as or similar to action responses provided by the system components 106 in response to vehicle inputs provided by the driver (e.g., via the steering wheel, accelerator pedal, brake pedal, cruise control settings, etc.).

At time index (F), the gateway module 110 performs validation of the vehicle action response. For example, the gateway module may validate the action response similar to the validation discussed above with respect to time index (C) of the data flow 200.

At time index (G), the gateway module 110 sends the vehicle action response to the autonomous driving components 108. For example, the gateway module may send the action response similar to the message sending discussed above with respect to time index (D) of the data flow 200.

Figure 4:
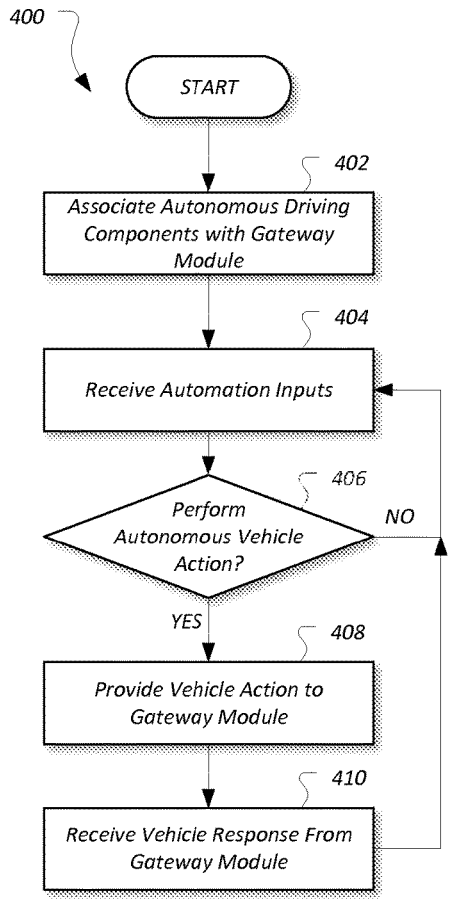
FIG. 4 illustrates an example process for providing automation commands to the vehicle.

FIG. 4 illustrates an example process 400 for providing automation commands to the vehicle 100. The process 400 may be performed, for example, by the autonomous driving computing device 112 of the autonomous driving components 108 in communication with the gateway module 110 of the vehicle 100.

At operation 402, the autonomous driving computing device 112 associates with the gateway module 110. For example, the autonomous driving computing device 112 may authenticate with the gateway module 110 to validate that the autonomous driving computing device 112 is authorized to interact with the vehicle 100. In an example, the autonomous driving computing device 112 and gateway module 110 may negotiate a key that may be used to encrypt or otherwise secure messages sent between the autonomous driving computing device 112 the gateway module 110.

At operation 404, the autonomous driving computing device 112 receives automation inputs. For example, the autonomous driving computing device 112 may receive vehicle data via the gateway module 110 connection to the vehicle bus 104. As another example, the autonomous driving computing device 112 may receive input from autonomous driving sensors 120 such as video camera devices, lasers, radar, sonar, or other types of distance and/or obstacle sensors. As a further example, the autonomous driving computing device 112 may receive input from the vehicle connectivity platform 122, such as via vehicle-to-infrastructure communication with vehicle infrastructure, such as traffic lights or other traffic controls and vehicle-to-vehicle communication with other automated vehicles 100.

At operation 406, the autonomous driving computing device 112 determines whether to perform an autonomous vehicle action. For example, the autonomous driving application 118 may utilize steering algorithms, braking algorithms, throttle algorithms, and user experience/human machine interface functionality to determine a vehicle action to be performed based on the received automation inputs. If the autonomous driving application 118 determines that an action should be performed, control passes to operation 408. Otherwise, control passes to operation 404 to receive additional inputs.

At operation 408, the autonomous driving computing device 112 provides the vehicle action request to the gateway module 110. For example, as discussed detail with respect to time indexes (A)-(D) of the data flow 300, the autonomous driving computing device 112 may provide the vehicle action request to the gateway module 110.

At operation 410, the autonomous driving computing device 112 receives a vehicle response from the gateway module 110. For example, as discussed detail with respect to time indexes (E)-(G) of the data flow 300, the autonomous driving computing device 112 may receive a vehicle action response from the gateway module 110 responsive to the vehicle action. After operation 410, control passes to operation 404 to receive additional input.

Figure 5:
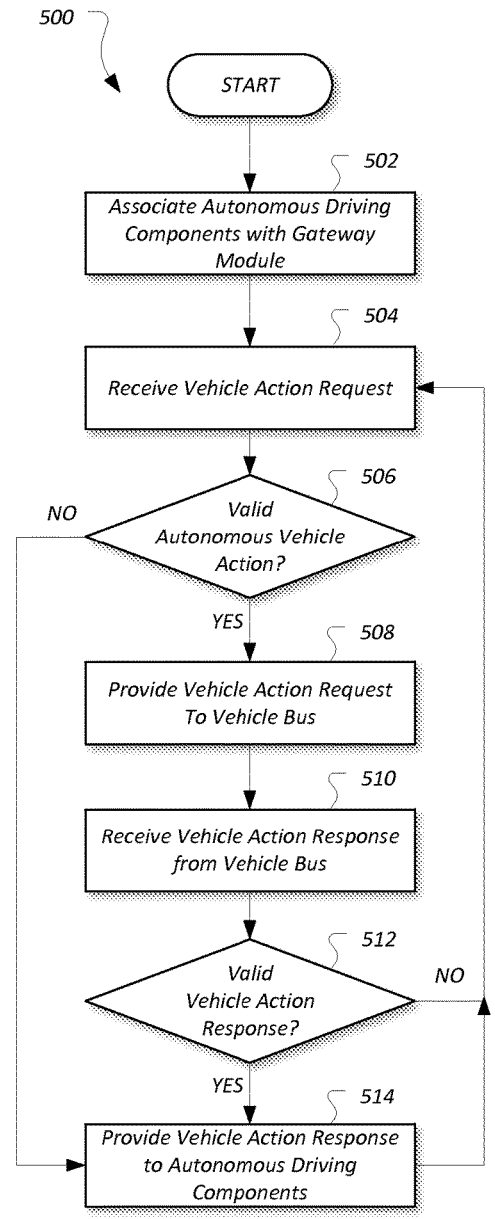
FIG. 5 illustrates an example process for providing automation commands to the vehicle.

FIG. 5 illustrates an example process 500 for communicating received automation commands to the vehicle 100. The process 500 may be performed, for example, by the gateway module 110 of the vehicle 100 in communication with the autonomous driving computing device 112 of the autonomous driving components 108.

At operation 502, the gateway module 110 associates with the autonomous driving computing device 112. For example, and similar to as discussed above with respect to operation 402 of the process 400, the autonomous driving computing device 112 may authenticate with the gateway module 110 to validate that the autonomous driving computing device 112 is authorized to interact with the vehicle 100.

At operation 504, the gateway module 110 receives a vehicle action request from the autonomous driving computing device 112. For example, similar to as discussed above with respect to operation 408 of the process 400 and time index (A) of the data flow 300, the gateway module 110 may receive the vehicle action request from the autonomous driving computing device 112.

At operation 506, the gateway module 110 determines whether the vehicle action request is valid. For example, similar to as discussed above with respect to time index (B) of the data flow 300, the gateway module 110 may perform validations on the vehicle action request. If validation of the vehicle request succeeds, control passes to operation 508. Otherwise, the gateway module 110 creates a failed vehicle action response and control passes to operation 514.

At operation 508, the gateway module 110 provides the vehicle action request to the vehicle bus 104. For example, similar to as discussed above with respect to time indexes (C)-(D) of the data flow 300, the gateway module 110 may provide the vehicle action request to the vehicle bus 104 for processing by the system components 106 of the vehicle 100.

At operation 510, the gateway module 110 receives a vehicle action response from the vehicle bus 104. For example, similar to as discussed above with respect to time index (E) of the data flow 300, the gateway module 110 may receive a vehicle action response from the vehicle bus 104 from a system component 106 of the vehicle 100 handling the vehicle action request.

At operation 512, the gateway module 110 determines whether the vehicle action response is valid. For example, the gateway module 110 may perform validations on the vehicle action response similar to as discussed above with respect to time index (C) of the data flow 200 and time index (F) of the data flow 300.

At operation 514, the gateway module 110 provides the vehicle action response to the autonomous driving computing device 112. For example, the gateway module may send the action response similar to the message sending discussed above with respect to time index (D) of the data flow 200 and time index (G) of the data flow 300. After operation 514, control passes to operation 504.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a gateway controller of a vehicle, including a hardware processor in electrical communication with vehicle controllers over a vehicle bus and in electrical communication with an in-vehicle autonomous driving system over a non-vehicle bus connection, the processor programmed to
negotiate a key with the autonomous driving system to use to encrypt messages sent over the non-vehicle bus connection between the autonomous driving computing device and the gateway controller,
send data from the vehicle bus over the connection to the autonomous driving system encrypted using the key,
receive a vehicle action request over the connection from the autonomous driving system encrypted using the key, and
translate the vehicle action request into a command provided to the vehicle bus for processing by the vehicle controllers to autonomously drive the vehicle.

2. The system of claim 1, wherein the gateway controller is further programmed to authenticate the autonomous driving system to validate that the autonomous driving system is authorized to interact with the vehicle.

3. A computer-implemented method comprising:
negotiating a key, by a gateway of a vehicle, between the gateway of the vehicle and an autonomous driving system of the vehicle to use to encrypt messages sent over a non-vehicle bus connection between the autonomous driving computing device and the gateway, the gateway being in communication with vehicle components over a vehicle bus and with the autonomous driving system over the non-vehicle bus connection,
sending, by the gateway, data from the vehicle bus over the connection to the autonomous driving system encrypted using the key,
receiving, by the gateway, a vehicle action request over the connection from the autonomous driving system encrypted using the key, and
providing, by the gateway, the vehicle action request to the vehicle bus for processing by the vehicle components to autonomously drive the vehicle.

4. The system of claim 1, wherein the gateway controller is further programmed to validate the data from the vehicle bus before providing the data from the vehicle bus over the connection to the autonomous driving system.

5. The system of claim 4, wherein to validate the data from the vehicle bus includes at least one of to: (i) adjust a data format of the data from the vehicle bus to conform with at least one data format requirement of the autonomous driving system, or to (ii) filter the data from the vehicle bus to provide only a subset of message types sent over the vehicle bus to the autonomous driving system.

6. The system of claim 1, wherein the gateway controller is further programmed to include an indication in the vehicle action request identifying the vehicle action request as being an automation command.

7. The system of claim 1, wherein the gateway controller is further programmed to send a vehicle action response over the connection to the autonomous driving system indicative of a result of the vehicle action request.

8. A system comprising:
an autonomous driving computing device embedded in a vehicle, having one or more processors configured to execute computer instructions, and a storage medium on which the computer-executable instructions are maintained, programmed to
authenticate with gateway hardware of the vehicle by negotiating a key over a non-vehicle bus connection, the vehicle including vehicle controllers connected to the gateway hardware over a vehicle bus,
receive data provided by the vehicle controllers to the vehicle bus via the non-vehicle bus connection to the gateway hardware, and
send, over the non-vehicle bus connection to the gateway hardware based on the data received from the gateway hardware, a vehicle action request encrypted using the key and including an instruction to be provided over the vehicle bus by the gateway hardware to command the vehicle controllers to autonomously drive the vehicle.

9. The method of claim 3, further comprising sending a vehicle action response over the connection to the autonomous driving system indicative of a result of the vehicle action request.

10. The system of claim 8, wherein the autonomous driving computing device is further configured to:
   receive input from autonomous driving sensors, and
   determine the vehicle action request further based on the input received from the autonomous driving sensors.

11. The system of claim 8, wherein the autonomous driving computing device is further configured to:
   receive input from a vehicle connectivity platform configured to perform at least one of vehicle-to-vehicle communication with other vehicles and vehicle-to-infrastructure communication with vehicle infrastructure; and
   determine the vehicle action request further based on the input received from the vehicle connectivity platform.

12. The system of claim 8, wherein the vehicle action request includes at least one of a throttle adjustment, a steering angle adjustment, and a braking adjustment to be performed by the vehicle controllers.

13. The system of claim 8, wherein the autonomous driving computing device is further configured to receive a vehicle action response over the connection to the gateway indicative of a result of the vehicle action request.

14. The method of claim 3, further comprising including an indication in the vehicle action request identifying the vehicle action request as being an automation command.

15. The method of claim 3, further comprising authenticating the autonomous driving system to validate that the autonomous driving system is authorized to interact with the vehicle.

16. The method of claim 3, further comprising validating the data from the vehicle bus before providing the data from the vehicle bus over the connection to the autonomous driving system.

17. The method of claim 16, wherein validating the data from the vehicle bus includes at least one of: (i) adjusting a data format of the data from the vehicle bus to conform with at least one data format requirement of the autonomous driving system, or (ii) filtering the data from the vehicle bus to provide only a subset of message types sent over the vehicle bus to the autonomous driving system.

* * * * *